United States Patent Office 3,403,916
Patented Oct. 1, 1968

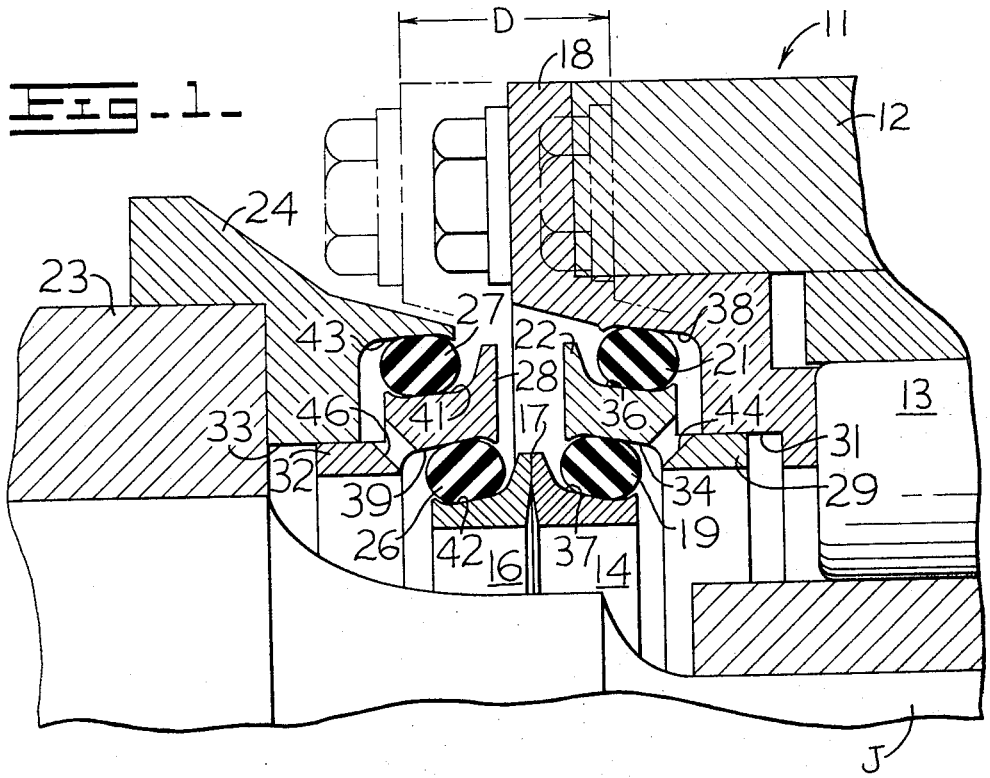
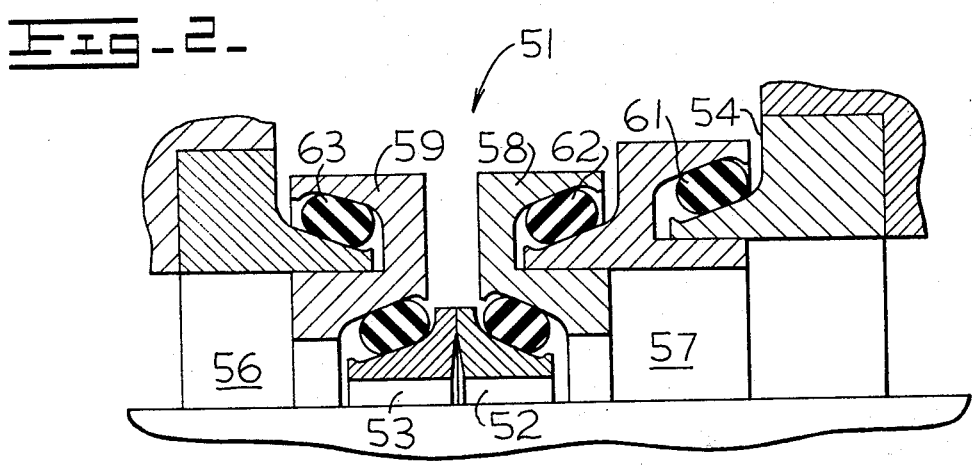

3,403,916
LOADING SYSTEMS FOR ROTARY FACE SEALS
Donald F. Durham, Peoria, and Donald D. Necessary, Morton, Ill., assignors to Caterpillar Tractor Co., Peoria, Ill., a corporation of California
Filed Mar. 18, 1966, Ser. No. 535,485
3 Claims. (Cl. 277—92)

The invention relates to a rotary face seal for parts which undergo a substantial amount of relative movement in an axial direction during operation. This invention has particular application to a seal for the journal box of a railroad car.

The rotary face seal of the present invention is an improvement of the seal shown in U.S. Patent No. 3,180,648 to Kupfert et al. The seal of the present invention, like the Kupfert et al. seal, includes a metal ring which has a seal face engaged with another seal element, generally an identical metal ring. The metal ring is resiliently suspended and the desired face load is supplied by an elastomeric O-ring which is compressed between an inclined back surface of the ring and an opposed inclined surface of a ring retainer. In many cases the inclined surface of the retainer may be formed directly on the part which supports the ring.

This method of resiliently supporting and loading the ring has proven quite effective and satisfactory in many thousands of track roller installations. However, the proper face load is a critical factor in rotary face seals of this kind. If the face load is too small, the seal face loses effective sealing contact. If the face load is too large, galling and fretting occurs. Thus, the face load must be maintained within a fairly narrow range during all conditions of operation of the rotary seal.

The problem of maintaining the face load within the required range becomes difficult when the parts with which the seal elements are associated undergo a substantial amount of relative movement in an axial direction during operation. While the seal arrangement disclosed in the above-noted Patent No. 3,180,648 to Kupfert et al. does provide a low spring rate (i.e., a relatively low rate of change of face load with change in axial position of the ring retainer) it cannot be made to accommodate the amount of axial movement encountered in many installations. The journal of a railroad car, for example, will commonly shift 1½ inches in an axial, or lateral, direction within the journal box.

It is therefore a primary object of the present invention to use a resiliently supported adapter between the elastomeric O-ring and the ring retainer in a manner which will accommodate such axial movement and still maintain the face load of the ring within a relatively narrow range for all operative conditions. It is a related object to provide a resilient suspension which will not only accommodate the axial movement but which will also maintain the required alignment of the seal elements.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is an elevation view in cross section through the upper portion of a railroad car journal box embodying one form of the present invention. The lateral shifting, or relative axial movement, of the journal with respect to the journal box is shown in phantom outline.

FIG. 2 is a view like FIG. 1 but showing another embodiment of the present invention.

In FIG. 1 a rotary face seal constructed in accordance with one embodiment of the present invention is indicated generally by the reference numeral 11.

In the particular installation shown in FIG. 1 the seal 11 seals lubricant within the journal box 12 of the drive wheel of a railroad locomotive. The seal also keeps dirt out of the journal box 12 and away from the bearing 13.

The seal includes two metal rings 14 and 16 engaged in sealing contact at their faces as indicated by the reference numeral 17. The ring 14 is nonrotatable and is mounted on the journal box by means of a retainer 18, elastomeric O-rings 19 and 21, and an adapter 22.

The ring 16 is rotatable with the journal J and is mounted on the wheel hub 23 by a retainer 24, elastomeric O-rings 26 and 27, and an adapter 28.

Thus, the faces of the rings 14 and 16 are rotated under load to provide the sliding contact for the rotary seal. The amount of the face load must be maintained within a relatively small range. The compression of the elastomeric O-rings 19, 21, 26 and 27 determines the amount of the face load.

It is a feature of the present invention that the journal and journal box can shift laterally with respect to one another a distance D, as indicated by the phantom outlines, while the face load is maintained within an operative range. In the case of the journal box seal installation illustrated in FIG. 1 the distance D may be in excess of 1½ inches with a variation of face loading from approximately 20 to 60 pounds.

The adapters 22 and 28, and the manner in which these adapters coact with the other parts of the seal permit this extended lateral shifting to occur with such relatively small variations in the face load. The adapters also permit greater shock loads and misalignment due to bending.

As illustrated in FIG. 1 the adapter 22 has a tubular extending portion 29 which is axially slidable within a corresponding cylindrical portion 31 of the retainer 18. This maintains radial alignment of the adapter 22 during axial shifting of the adapter with respect to the retainer. The adapter 28 is formed with a similar tubular portion 32 which slides within a cylindrical portion 33 of the retainer 24.

The adapter 22 has generally axially extending inclined surfaces 34 and 36 which engage the corresponding O-rings 19 and 21. The inclined surfaces 34 and 36 are effective to compress the O-rings between opposed inclined surfaces 37 and 38 formed on the back side of the ring 14 and the inner surface of the retainer 18.

As illustrated in FIG. 1 the opposed inclined surfaces 36 and 38 may be slightly convergent, and the opposed inclined surfaces 34 and 37 may also be slightly convergent, in the direction of the engaged faces of the rings 14 and 16 to provide a slight increase in face load as the ring 14 shifts toward the journal box 12. It is the degree of relative inclination of these pairs of opposed inclined surfaces that determines the variation in face load with axial shifting of the journal J within the journal box 12.

The adapter 29 is also formed with inclined surfaces 39 and 41. These inclined surfaces, in conjunction with opposed inclined surfaces 42 and 43 of the ring 16 and retainer 24, compress the O-rings 26 and 27 to apply the face load to the ring 16.

The adapter 22 has a series of circumferentially spaced holes 44 which serve as vent openings to prevent pressure build-up during rapid lateral movement of the journal within the journal box. The adapter 28 has a similar set of openings 46.

Another seal constructed in accordance with the present invention is illustrated in FIG. 2 and is indicated generally by the reference numeral 51. The seal 51 includes two relatively rotatable rings 52 and 53. Retainers 54 and 56 have inclined surfaces which coact with inclined surfaces of adapters 57, 58, and 59 to apply the face load to the rings through compressed elastomeric O-rings 61, 62 and 63.

The form of the invention shown in FIG. 2 includes two adapters 57 and 58 in series to permit greater axial shifting of the retainers 54 and 56 with respect to one another.

The form of the invention shown in FIG. 2 also illustrates that the adapters can take various configurations to accommodate the seal to the particular installation.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A face seal for the journal box of a railroad car effective to maintain fluid sealing contact between the seal faces during lateral movement of the journal within the journal box and comprising, a metal seal ring mounted for rotation with the journal and having a first radially extending seal face, a nonrotatable metal seal ring mounted in the journal box and having a second radially extending seal face, said first and second seal faces being in engagement, and a generally axially extending inclined surface on the back side of each said seal ring, a resilient O-ring engaged with the inclined surface of each said seal ring, a ring retainer on each of said journal and journal box, each of said retainers having generally laterally extending inclined retainer surfaces, additional resilient O-rings engaged with said retainer surfaces, and adapter elements mounted for lateral movement within the retainers, each of said adapter elements formed with generally laterally extending inclined surfaces opposed to the adjacent inclined surfaces of said seal rings and said retainers and engaged with the adjacent O-rings to transmit seal face loading forces from said retainers to said seal rings, and wherein the opposed inclined surfaces have a small amount of relative inclination.

2. A face seal as defined in claim 1 wherein the adapters are formed with vent openings to prevent pressure build-up during rapid lateral movement of the journal within the journal box.

3. A face seal as defined in claim 1 wherein the adapters have portions which slidably interfit with the retainer to maintain radial alignment of the seal.

References Cited

UNITED STATES PATENTS

| 3,073,657 | 1/1963 | Oxford. | |
|---|---|---|---|
| 3,167,321 | 1/1965 | Land et al. | 277—92 |
| 3,180,648 | 4/1965 | Kupfert et al. | 277—92 |

FOREIGN PATENTS

| 63,587 | 9/1955 | France. |
|---|---|---|

LAVERNE D. GEIGER, *Primary Examiner.*

J. MEDNICK, *Assistant Examiner.*